Patented Dec. 17, 1940

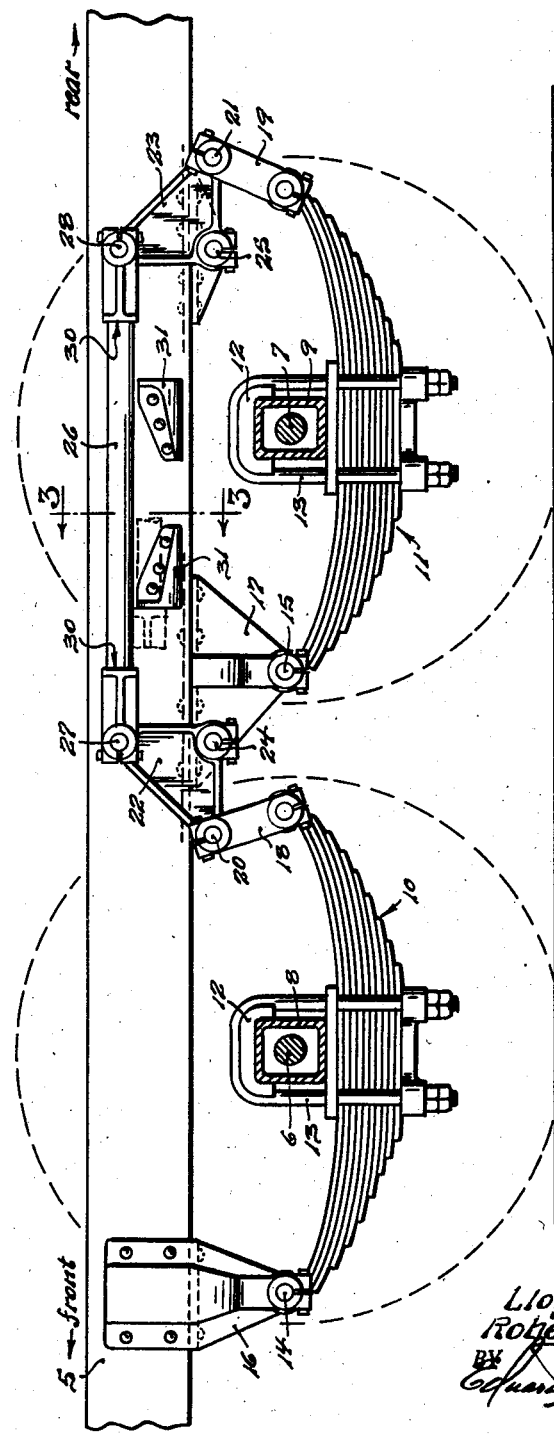
Fig. I.
Inventors:
Lloyd A. Mallett
Robert C. Norrie
ATTORNEY

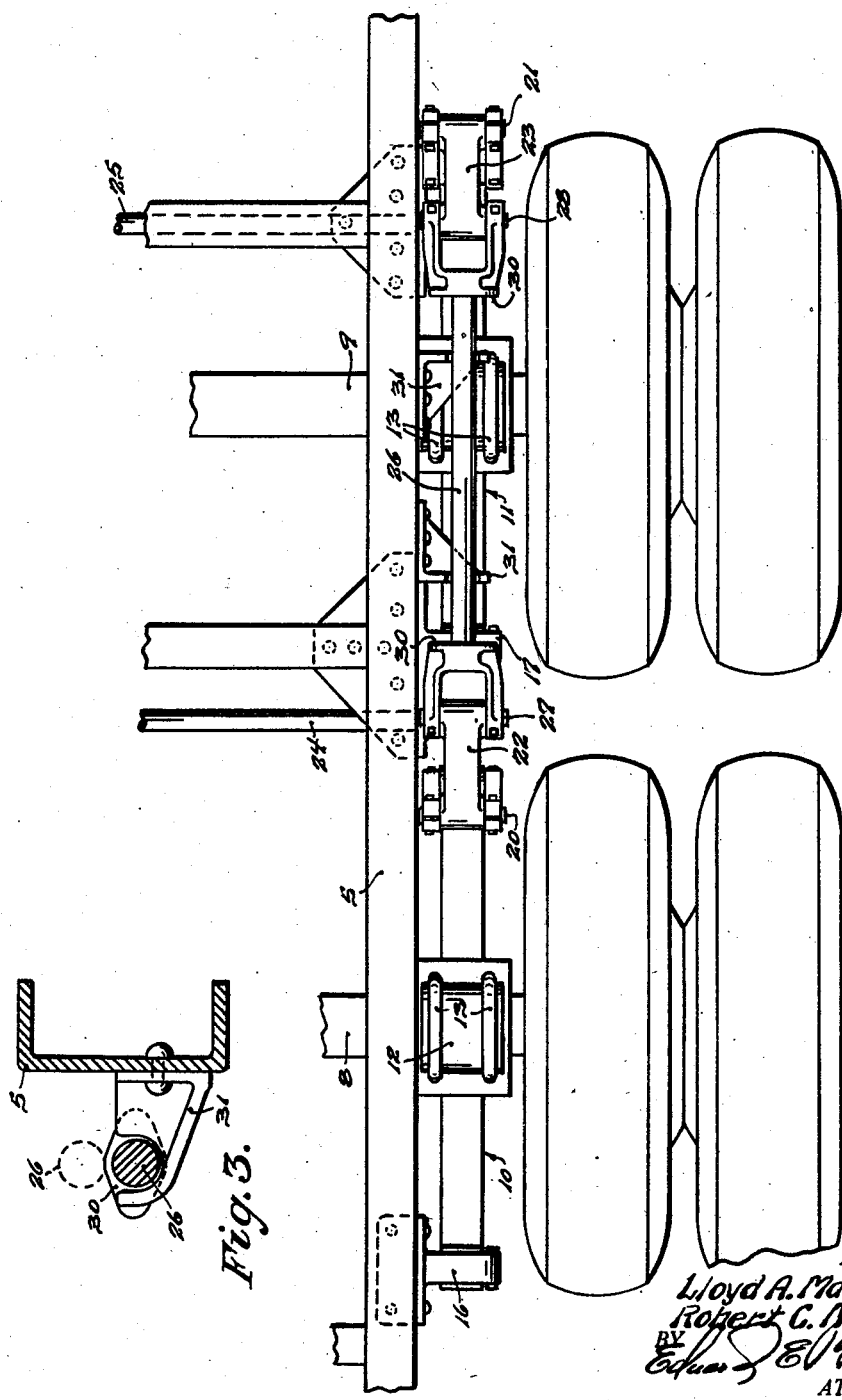

2,225,016

UNITED STATES PATENT OFFICE 2,225,016

SUSPENSION MECHANISM FOR DRIVEN AND BRAKED TANDEM AXLE TRUCKS

Lloyd A. Mallett and Robert C. Norrie, Seattle, Wash., assignors to Kenworth Motor Truck Corporation, Seattle, Wash., a corporation of Washington Application August 2, 1937, Serial No. 156,843

4 Claims. (Cl. 180—22)

This invention relates to six-wheel three-axle trucks of the class providing single or dual drive tandem rear axles, both of which are braked, and more particularly has reference to a torque-resisting suspension for such rear axles.

The principal objects of our invention are to provide an axle-suspending arrangement which, by the employment of a four-point mounting for each of the two sides of the truck rear end, obtains a better condition for frame stresses and thereby permits the use of a lighter vehicle frame than has heretofore been possible, to provide an arrangement the design of which locates the rearmost frame support to the rear of the rear axle and in such distal relation to the foremost frame support as to distribute the load over the greatest feasible area of the vehicle frame, to provide an assembly which, by the use of companion bell cranks in association with a compression tie-rod, the bell cranks operating about fixed axes, maintains the suspension hook-up in more effective alignment than has been possible with the cantilever-type single bearing equalizing beam heretofore constituting the most advanced torque-resisting unit for driven and braked tandem axles, to further provide an arrangement which lends itself to a properly engineered distribution of the rear end weight of the truck relative to the axles by varying the lengths of the bell-crank legs, and still further to provide, in torque-resisting axle-suspending equipment for trucks of this character, novel stop mechanism operative to limit the rocking moment of the axles under road or extreme stress influence.

The foregoing will, with other objects and advantages, become apparent in the course of the following detailed description and claims, the invention consisting in the novel construction, adaptation, and combination of parts illustrated in the accompanying drawings and hereinafter described and claimed.

In said drawings:

Figure 1 is a fragmentary longitudinal vertical section taken exteriorly of the vehicle main frame to illustrate the rear portion of a dual-drive tandem axle truck incorporating suspension mechanism according to the present invention.

Fig. 2 is a fragmentary top plan view thereof representing one side only of the vehicle frame and deleting associated driving mechanism by which power is delivered from the truck motor to the tandem rear axles; and Fig. 3 is a detail transverse vertical section illustrating the stop mechanism employed to limit the vertical deflection of the axles, the view, excepting that the position of the associated compression tie-rod is indicated at one extreme of its permitted movement, being taken to an enlarged scale on the line 3—3 of Fig. 1.

We represent, by the numeral 5, one of the main-frame side girders of the truck chassis, 6 and 7 indicating, respectively, the forward and the rear axles of a dual-drive tandem assembly 10 while 8 and 9 denote the housings which carry said live axles. Both axles necessarily are braked.

The housings are desirably of a rectangular sectional configuration surmounted by saddles 12 which are engaged by U-clips 13 to bolt the housings securely to supporting leaf-spring assemblies 10 and 11, thus transferring torque directly from the axles to the springs, the springs at their forward ends being given a fixed pivotal mounting on trunnions 14 and 15 which are respectively journaled in frame-carried brackets 16 and 17. At their rear ends the springs connect with shackles 18 and 19 and the shackles in turn connect by pins 20 and 21 with oppositely directed legs of bell cranks 22 and 23. Journaled as at 24 and 25 in fixed relation to the vehicle frame, the forward bell crank 22 lies substantially in median relation to the two axles while the rear bell crank lies to the rear of the rearmost axle a distance less than the spacing between said axle and the forward journal 24. Tying the bell cranks is a compression rod 26 terminally forked to receive crank pins 27 and 28.

With reference to the referred-to stop devices, the forked ends of the compression tie-rod 26 are of a form to provide contact shoulders 30 which in the two extremes of tie-rod movement, which is to say a movement approaching a cramping position of either of the two shackles 18 or 19, engage according to the direction of longitudinal movement of the tie-rod one of two stirrups 31 boltably fixed to the frame girder 5. The stirrups are formed with pockets (Fig. 3) to accommodate vertical deflection of the tie-rod below the upper limits of the stirrups and more effectively resist the spring-cushioned longitudinal thrust of the contacting shoulder 30.

The torque reaction to be controlled in tandem axle trucks of the described character is the tendency of the axle housings to rotate with the wheels following application of the brakes and to rotate in the opposite direction under the influence of a forward drive. This twisting tendency, transmitted to the springs, influences the rear end of each spring upwardly and downwardly in the respective instance and the tie-rod acts to balance the load between the two axles such that the pressure between the tires and the road surface remains constant, consequently eliminating the objectionable bouncing action which results where torque is improperly balanced. The tendency in a tandem axle truck of which only the forward axle is driven is to drive that axle downwardly under the influence of a forward power impulse, an advantageous reaction operating to increase the frictional grip as between the tread surface of the driven tires and the road. The axle suspension derives its effectiveness with this character of tandem axle truck to balance the braking torques. Where, as commonly applied, the brake drums of the live axles in a single-drive tandem axle hook-up are of increased size over those employed on the trailer wheels, the braking torques are balanced by varying the lengths of the bell crank legs to the proper leverage ratio.

The structure which most nearly approaches our arrangement in torque-balancing results in that illustrated in Fig. 8 of United States Letters Patent No. 1,933,675, issued to A. I. Marcum November 7, 1933. While having a like function, the present development over such disclosure obtains a major reduction in weight, appreciably better distribution of the load, and a more durable unit in that continued alignment of parts is obtained from the twin spaced bearings which absorb the major portion of the load as distinguished from the single bearing in the identified patent lying at the midlength of the equalizing beam. This single bearing, more particularly, transfers approximately two-thirds of the entire back end weight to a single point on the frame lying forwardly of the rear axle to necessarily cause a sacrifice of the pay load in favor of an increase in the weight of the parts. The cross-tube coupling which has been applied in Marcum's assembly has failed to any appreciable extent to overcome the adverse concentration of stresses.

We intend to imply only such restrictions in the hereto annexed claims are are necessarily specified therein to distinguish from the prior developments in the art, expecting that such claims be interpreted with a breadth commensurate with the scope of the invention. We admit the introductory clause, where reference is had to driven and braked tandem rear axle assemblies, as the designation of a specific character of vehicle from the fact that the invention can be considered as achieving the ends set forth only where opposingly directed driving and braking torques are encountered.

What we claim is:

1. In a vehicle employing braked tandem rear axles, at least one of which is driven, the combination with the vehicle frame, the axles, and housings for said axles, leaf-spring assemblies secured at their mid-lengths in fixed relation to the axle housings and pivotally supported at the front ends by the frame, frame-carried bell cranks lying to the rear of each of the axles to locate one leg of each bell crank vertically and the other leg horizontally with the horizontal legs extending in opposite directions from the respective fulcrums into overlying relation to the rear ends of related spring assemblies, shackles connecting said rear ends of the spring assemblies to the related horizontal arms of the bell cranks, and a compression tie-rod extending between the vertical legs of the bell cranks to oppose movement of the axles under the influence of like torque reactions, the tie-rod having means associated therewith for limiting bell crank movement.

2. The combination with the vehicle main frame, the axles, and the axle housings of a tandem axle vehicle, means for suspending the axles from the frame comprising flexible torque-transfer members fixedly secured to the axle housings and pivotally supported at one end of each by the frame, bell cranks the fulcrums of which are fixed with respect to the frame supporting the opposite free ends of the torque-transfer members, a compression tie-rod coupling the bell cranks to oppose like movement of the torque-transfer members about their pivotally supported ends, and stirrups acting to receive the tie-rod to operate as stop devices for limiting the movement of the bell cranks.

3. In a vehicle employing tandem rear axles, housings therefor, the combination with said rear axles and the vehicle main frame, mechanism having, as respects each side of the frame, a four-point mounting thereon for suspending the axles from the frame, said mechanism comprising levers fulcrumed at longitudinally spaced intervals to the frame and independent torque-transfer members for the respective axles fixedly secured to the axle housings and having connection at the front and rear ends, respectively, with the frame and with the levers, a longitudinally movable rigid member coupling the levers for unitary movement and acting to prevent like movement of the torque-transfer members about their pivotally supported ends, and devices directly associated with the rigid member for limiting the longitudinal movement of the same.

4. In a vehicle, in combination with a pair of axles, housings therefor, and a vehicle frame, leaf springs for each of the axles secured between the ends thereof to respective axle housings, pivotal connection between the forward end of each spring and the vehicle frame, a frame-supported series of interconnecting members leading from the rear end of one spring to the rear end of the other spring and acting to oppose movement of the axles under the influence of like torque reactions, and means acting directly on said interconnecting members for limiting movement thereof.

LLOYD A. MALLETT.
ROBERT C. NORRIE.